(12) United States Patent
Yuen

(10) Patent No.: US 7,987,174 B2
(45) Date of Patent: Jul. 26, 2011

(54) SEARCH ENGINE FOR VIDEO AND GRAPHICS

(75) Inventor: Henry C. Yuen, Pasadena, CA (US)

(73) Assignee: Gemstar Development Corporation, Hollywood, CA (US)

( * ) Notice: Subject to any disclaimer, the term of this patent is extended or adjusted under 35 U.S.C. 154(b) by 0 days.

(21) Appl. No.: 12/819,365

(22) Filed: Jun. 21, 2010

(65) Prior Publication Data

US 2010/0312761 A1 Dec. 9, 2010

Related U.S. Application Data

(63) Continuation of application No. 11/894,684, filed on Aug. 20, 2007, now Pat. No. 7,822,760, which is a continuation of application No. 11/021,478, filed on Dec. 22, 2004, which is a continuation of application No. 09/452,287, filed on Nov. 30, 1999, now Pat. No. 6,859,799.

(60) Provisional application No. 60/110,299, filed on Nov. 30, 1998.

(51) Int. Cl.
  *G06F 7/00* (2006.01)
  *G06F 17/30* (2006.01)
(52) U.S. Cl. ........ 707/711; 707/715; 707/736; 707/741; 707/770
(58) Field of Classification Search .................. 707/711, 707/715, 736, 741, 770
See application file for complete search history.

(56) References Cited

U.S. PATENT DOCUMENTS

| | | |
|---|---|---|
| 5,474,000 A | 12/1995 | Mizuno et al. |
| 5,475,835 A | 12/1995 | Hickey |
| 5,517,605 A | 5/1996 | Wolf |
| 5,583,566 A | 12/1996 | Kanno et al. |
| 5,614,940 A | 3/1997 | Cobbley et al. |
| 5,659,742 A | 8/1997 | Beattie et al. |
| 5,696,869 A | 12/1997 | Abecassis |
| 5,734,886 A | 3/1998 | Grosse et al. |
| 5,742,816 A | 4/1998 | Barr et al. |
| 5,751,286 A | 5/1998 | Barber et al. |
| 5,752,246 A | 5/1998 | Rogers et al. |
| 5,790,176 A * | 8/1998 | Craig ........................... 725/115 |

(Continued)

FOREIGN PATENT DOCUMENTS

| | | |
|---|---|---|
| EP | 0525427 | 2/1993 |
| JP | 09-138804 | 5/1997 |
| KR | 1019970078662 | 12/1997 |

OTHER PUBLICATIONS

Bryhni et al.—"On-demand Regional Television over the Internet"—ACM Multimedia'96 Boston MA USA 1996 ACM (pp. 99-107).*

(Continued)

*Primary Examiner* — Jean B. Fleurantin
*Assistant Examiner* — Anh Ly
(74) *Attorney, Agent, or Firm* — Ropes & Gray LLP

(57) ABSTRACT

A method of selecting graphic or video files having corresponding locators used to locate such graphic or video files using a computer. Identifiers are created by searching an area within a web page near a graphic or video file for searchable identification terms and searching an area within a web page near links to a graphic or video for searchable identification terms. The identifiers are stored in a database. User requests for graphic or video file content are received and the database of identifiers is searched to find graphic and video files corresponding criteria of the user. Graphic or video file content is then provided to the user.

14 Claims, 4 Drawing Sheets

U.S. PATENT DOCUMENTS

| | | | | |
|---|---|---|---|---|
| 5,796,829 | A | * | 8/1998 | Newby et al. ............... 705/54 |
| 5,812,134 | A | | 9/1998 | Pooser et al. |
| 5,813,009 | A | * | 9/1998 | Johnson et al. ............ 707/741 |
| 5,911,139 | A | | 6/1999 | Jain et al. |
| 5,956,716 | A | | 9/1999 | Kenner et al. |
| 5,987,454 | A | | 11/1999 | Hobbs |
| 6,014,184 | A | | 1/2000 | Knee et al. |
| 6,028,603 | A | | 2/2000 | Wang et al. |
| 6,075,530 | A | | 6/2000 | Lucas et al. |
| 6,166,735 | A | | 12/2000 | Dom et al. |
| 6,172,674 | B1 | | 1/2001 | Etheredge |
| 6,177,931 | B1 | | 1/2001 | Alexander et al. |
| 6,185,573 | B1 | | 2/2001 | Angelucci et al. |
| 6,209,103 | B1 | | 3/2001 | Schreiber et al. |
| 6,243,419 | B1 | | 6/2001 | Satou et al. |
| 6,266,657 | B1 | * | 7/2001 | deVries et al. ............ 707/741 |
| 6,269,394 | B1 | | 7/2001 | Kenner et al. |
| 6,271,840 | B1 | | 8/2001 | Finseth et al. |
| 6,275,268 | B1 | | 8/2001 | Ellis et al. |
| 6,275,829 | B1 | | 8/2001 | Angiulo et al. |
| 6,305,019 | B1 | * | 10/2001 | Dyer et al. .................. 725/91 |
| 6,324,538 | B1 | | 11/2001 | Wesinger, Jr. et al. |
| 6,357,042 | B2 | * | 3/2002 | Srinivasan et al. ........... 725/32 |
| 6,370,543 | B2 | * | 4/2002 | Hoffert et al. ............. 725/113 |
| 6,397,387 | B1 | | 5/2002 | Rosin et al. |
| 6,449,608 | B1 | | 9/2002 | Morita et al. |
| 6,573,907 | B1 | * | 6/2003 | Madrane ................... 709/217 |
| 6,701,060 | B2 | | 3/2004 | Yuen et al. |
| 6,859,799 | B1 | | 2/2005 | Yuen |
| 7,155,451 | B1 | | 12/2006 | Torres |
| 7,328,450 | B2 | | 2/2008 | Macrae et al. |
| 7,372,976 | B2 | | 5/2008 | Rhoads et al. |
| 7,769,775 | B2 | | 8/2010 | Yuen |
| 2001/0042098 | A1 | * | 11/2001 | Gupta et al. ............... 709/206 |
| 2003/0088613 | A1 | | 5/2003 | Goldschmidt lki et al. |
| 2004/0128514 | A1 | | 7/2004 | Rhoads |
| 2005/0013462 | A1 | | 1/2005 | Rhoads |
| 2007/0055689 | A1 | | 3/2007 | Rhoads et al. |

OTHER PUBLICATIONS

Rune Hjelsvold and Roger Midtstraum—"Modelling and Querying Video Data" —Proceedings of the 20$^{th}$ VLDB conference, Santiago, Chile, 1994 (pp. 686-694).*

Harrison, Leon, "A review of multimedia technology and dissemination systems," *Electronic Publishing*, 7:3, 1994 (pp. 117-146).

Orphanoudakis et al., "I$^2$Cnet: Content-based similarity search in geographically distributed repositories of medical images," Image and Graphics, Citeseer, 1996 (pp. 1-23).

Provisional Application, U.S. Appl. No. 60/022,436 filed Aug. 6, 1996.

Rainer Lienhart —"Automatic text recognition for video indexing" —Proc. Of the Fourth ACM International Conference on Multimedia, ACM 1996 *(pp. 11-20).

Smith J. R. et al., "An image and video search engine for the worldwide web" —Proceedings of SPIE, vol. 3022, Feb. 13, 1997 (pp. 84-95).

Tzi-cker Chiueh—"Content-based Image Indexing" —Proc. Of the 20th International Conference on Very Large Database 1994 (pp. 582-593).

Yang et al., "Automatic Indexing of News Video for the Content-based Retrieval," SPIE vol. 3422, pp. 176-186. From SPIE Conference on Input/Output and Imaging Technologies, Taipei, Taiwan, Jul. 1998.

Smith et al., "Visually Searching the Web for Content", Columbia University; IEEE; Jul.-Sep. 1997 (pp. 12-20).

Harmandas V. et al., "Image retrieval by hypertext links" —Proceedings of the 20$^{th}$ Annual International ACM-SIGIR Conference on Research and Development in Information Retrieval Jul. 27, 1997 (pp. 296-303).

International Business Machines Corporation, Research Disclosure, "Use of close captioning for indexing and retrieval of video" —Mason Publications, Hampshire, Great Britain, vol. 413, No. 125, Sep. 1998.

Apers et al., "Content-based retrieval in Multimedia databases based on feature models" —Advanced Multimedia Content, Springer Berlin/Heidelberg vol. 1554, Jan. 1999 (pp. 119-130).

Abbott et al. "Video Formats and Resolution," Nuclear Plan Journal, 1994 (pp. 1-11).

Maltins, "Movie and Video Guide-for Palm Powered Handhelds," New York, Net Book, 1992, Landware.com (pp. 1-14).

Yura et al. "Design and Implementation of the browser for the Multimedia Multi-User Dungeon of the Digital Museum," Computer Human Interaction, 1998 Proceedings, 3rd Asia Pacific Jul. 15-17, 1998 pp. 1-6 or 44-49).

* cited by examiner

SEARCH ENGINE FOR VIDEO AND GRAPHICS

REFERENCE TO RELATED APPLICATIONS

This application is a continuation of U.S. patent application Ser. No. 11/894,684, filed Aug. 20, 2007, now U.S. Pat. No. 7,822,760, which is a continuation of U.S. patent application Ser. No. 11/021,478, filed Dec. 22, 2004, which is a continuation of U.S. patent application Ser. No. 09/452,287, filed Nov. 30, 1999, now U.S. Pat. No. 6,859,799, which claims priority to U.S. Provisional Application No. 60/110,299, filed Nov. 30, 1998, all of which are hereby incorporated by reference in their entireties.

FIELD OF THE INVENTION

This invention relates generally to Internet search engines, and more particularly to a search engine for retrieval of video and graphics over the Internet.

BACKGROUND OF THE INVENTION

Over the past few years, the amount of content available over the Internet has grown tremendously. Much of the Internet's content is distributed widely across many locations. Therefore, a search engine and/or navigator is required for meaningful retrieval of information. There are numerous search engines and navigators available to search for specific content on the Internet.

Current search engines and navigators are designed to search for text within the text contained in web pages or other files on the Internet or a written description of the web page to be located. A search engine stores the location of a given piece of information and various descriptions of the information in a database that is searchable by a user. Often, the information to be located is itself descriptive.

A search engine may rely upon the content providers to establish both the location of the content and descriptive search terms to enable users of the search engine to find the content. Alternatively, the process of search engine registration is automated. A content provider places a "meta-tag" into their web page or other content. The "meta-tag" contains keywords that a search engine can index the page location upon to enable searching. The "meta-tag" is not displayed by a page reader's web browser software.

A search engine may use a web crawler to search for content on the Internet. The web crawler automatically "spiders" through web pages by following every link from one web page to other web pages until all of the links are exhausted. As the web crawler spiders through pages, the web crawler correlates the descriptive tags on each page viewed with the location of the page to construct a searchable database.

Recently, advances in Internet access have enabled more users to create video and graphic content and to distribute that content over the Internet. Furthermore, video streams are becoming more and more common as a form of content on the Internet. As with text and file content, the increasingly large amount of video and graphic content is distributed widely across many locations, thus creating the need for a search engine and/or navigator for meaningful retrieval of information.

The need to be able to search for video or graphics will only continue to grow as streaming video becomes more available and popular over the Internet or similar information transferal systems, such as on-line services, Intranets, etc. Furthermore, as personal computers and other office or home equipment develop larger and larger memory and storage capacity, the storage of video streams will become even more common and the need for a video search engine ("VSE") will increase.

Video and graphic content does not lend itself to easy searching because video and graphics often do not contain any text description that can be searched with a currently available navigator or search engine. Furthermore, there is no uniform format for identifying and describing a video or a graphic. Therefore, currently available search engines and browsers are inefficient and unusable for meaningful retrieval of video and graphic information over the Internet. There is currently no easy or direct way to search for a video or to search, display, select, or take action on, video streams. As the usage of video streams becomes even more common, there is a need for a centralized navigator and search engine for video streams.

One object of the present invention is to provide a search engine for graphics and video.

SUMMARY OF THE INVENTION

The present invention provides a method of searching for graphic or video files having corresponding locators used to locate such graphic or video files using a computer. The method comprises creating an identifier of searchable file information from identifier information related to a graphic or video file and storing the identifier and the locator for the graphic or video file in a database. The method further comprises receiving search criteria, and searching the identifiers in the database in order to select content matching the request of the user. The results of the search are sent or displayed for the user. In another embodiment of the present invention, video and graphic content is provided to a user based on user submitted criteria.

In a preferred embodiment of the present invention, identifiers are created by searching an area within a web page near a graphic or video file and by searching an area within web pages near links to a graphic or video file for searchable identification terms.

The present invention provides a system for searching for graphic or video files having corresponding locators used to locate such graphic or video files. The system comprises a means for creating an identifier containing searchable file information from identifier information related to a graphic or video file. The system further comprises a database for storing an identifier, as well as an input for receiving search criterion from a user. The system uses a search engine to search the identifiers in the database. The system sends or displays the results of the search for the user.

These and other aspects of the present invention are more readily understood when considered in conjunction with the accompanying drawings and the following detailed description.

DETAILED DESCRIPTION

Figure 1:
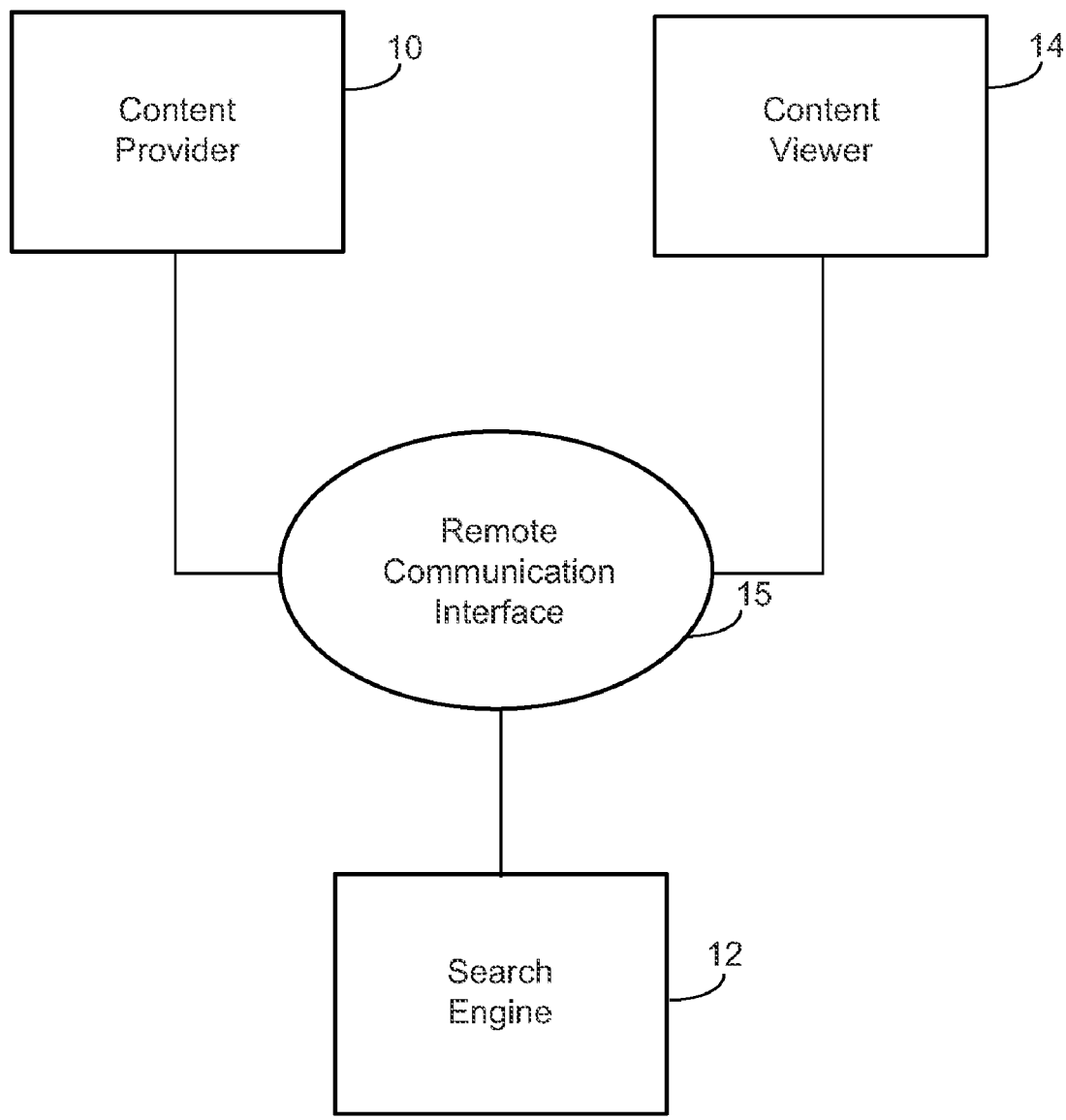
FIG. 1 is a block diagram of a system utilizing a video search engine in accordance with one embodiment of the present invention.

An overview of a video search engine ("VSE") in accordance with the present invention is illustrated in FIG. 1. The system of FIG. 1 comprises a content provider 10, a search engine 12, and a content viewer 14. The content provider, the search engine, and the content viewer, are coupled to each other via a remote communication interface 15. In the embodiment described, the remote communication interface comprises the Internet, although in alternative embodiments the remote communication interface comprises an Intranet, or other computer to computer interface. In the embodiment described, the content site, the search site, and the viewer site all comprise computers. In alternative embodiments, the content site, the search site, and/or the viewer site comprise set-top boxes. In another embodiment, one site may contain more than one of the viewer site, content site, and search site, such as one site containing both the viewer site and the search engine.

Figure 2:
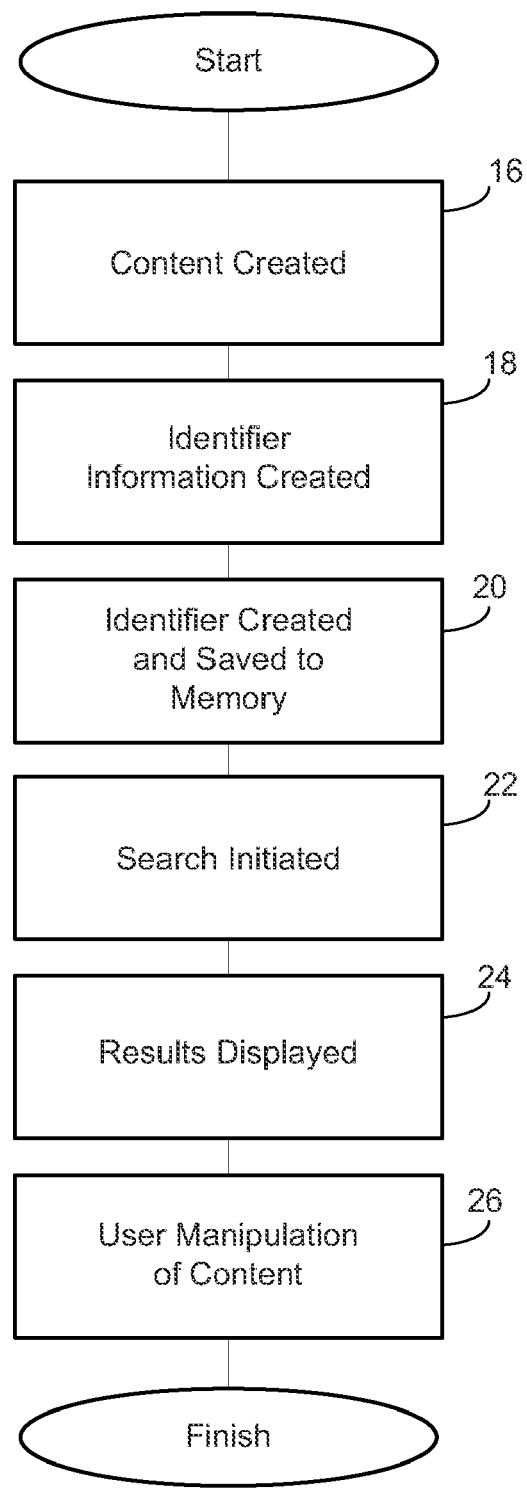
FIG. 2 is a flow diagram of a process of content development, identifier creation, and search.

An overview of a process in accordance with one embodiment of the present invention is shown in FIG. 2. The graphic or video content is created 16. Identifier information is inserted into the graphic or video file, or the area surrounding a graphic or video file link 18. The process receives searchable identifier information including the location of the file and creates an identifier entry in a storage device 20. The process receives a request for video or graphic content from a user 22. The process conducts a search for video or graphic content and displays the results to the user 24. The process provides numerous services on the selected video and graphic files to the user 26.

Graphic or video content is created using specialized software and hardware, as well as other equipment such as a camera. For example, a graphic may be created by scanning a picture with a scanner, or by creating a freehand drawing in a drawing program. A video may be created for example by using a digital video camera, or by digitizing analog video using a video capture board in a computer. As used herein the term video includes animation.

In an embodiment of the present invention, the process for searching and manipulating video and graphic content over the Internet comprises a system of identifiers. An identifier is created for each graphic or video file from pieces of information herein called identifier information. As shown in the examples below, an identifier for a video file comprises one or more of the following: a text string or other searchable attribute of a whole, segment, frame, or sub element of a video. The identifiers are used to consistently identify a whole, segment, frame, or sub element of a video respectively. An identifier for a graphic file comprises a text string or other searchable attribute of the graphic file.

Examples of identifiers are shown below. Example 1 is a whole video identifier. Example 2 is a video segment identifier. Example 3 is a video frame identifier.

EXAMPLE 1

A whole video identifier comprises one or more of the following:
Format of video stream
Size of video stream
Play time of video stream (including number of frames)
Whether or not sound is contained
Date of creation
Category of video stream
Whether it requires conditional access or payment
Text description of the video stream (This may also be broken down into additional fields including: content, author, director, year made, category, actor/actresses, owner, star rating, and parental control code.)
Representative frame of the video stream
Representative audio stream
Number of identified segments in the video stream
Number of identified frames in the video stream
A unique ID
Linking and other association information

EXAMPLE 2

A video segment identifier comprises one or more of the following:
Unique ID of the video stream to which it is a segment
Segment sequence information (from frame x to frame y) which allows unique identification of the frame when used with the unique ID of the video stream
Category of video segment
Whether it requires conditional access or payment
Text description of the video segment (This may also be broken down into additional fields including: content, author or director, year made, category, actor/actresses, owner, star rating, and parental control code.)
Representative frame of the video segment
Representative audio stream
Number of identified segments in the video segment
Number of identified frames in the video segment
Linking and other association information

EXAMPLE 3

A video frame identifier comprises one or more of the following:
Unique ID of the video stream in which it is a frame
Frame sequence information which allows unique identification of the frame when used with the unique ID of the video stream
Category of video frame
Whether it requires conditional access or payment
Text description of the video frame (This may also be broken down into additional fields including: content, author or director, year made, category, actor/actresses, owner, star rating, parental control code.)
Linking and other association information In a preferred embodiment, the textual elements of the identifier are standardized to facilitate creation, searching and archiving. In additional embodiments, one or more of the textual elements of the identifier is in coded, compressed, or encrypted form. Additionally, the textual elements in coded form utilize static and/or dynamic dictionaries.

In an embodiment of the present invention, the process for integrating identifier information into a video or graphic file is a part of the creation of the graphic or video file. The process is resident in the software or hardware used to create the content, and integrates identifier information into the graphic or video automatically as the video or graphic is saved to a storage device, such as a hard disk, optical disk, floppy disk or similar device.

In an alternative embodiment of the present invention, a process for integrating identifier information into a video or graphic file is performed after the creation of the graphic or video. Already created graphic or video files are submitted to a process server along with desired identifier information and the files are modified with identifier information. The modified file is saved to a storage device, such as a hard disk, optical disk, floppy disk or similar device.

The process provides a means of attaching identifier information to a video in a manner that does not interfere with the viewing clarity of the video. In an embodiment of the present invention, the process integrates textual identifier information into the filename of the video stream or graphic file. In an alternative embodiment of the present invention, the identifier information is located in a part of the file that is not displayed by viewer software, such as at the beginning or the end of the file.

Figure 3:
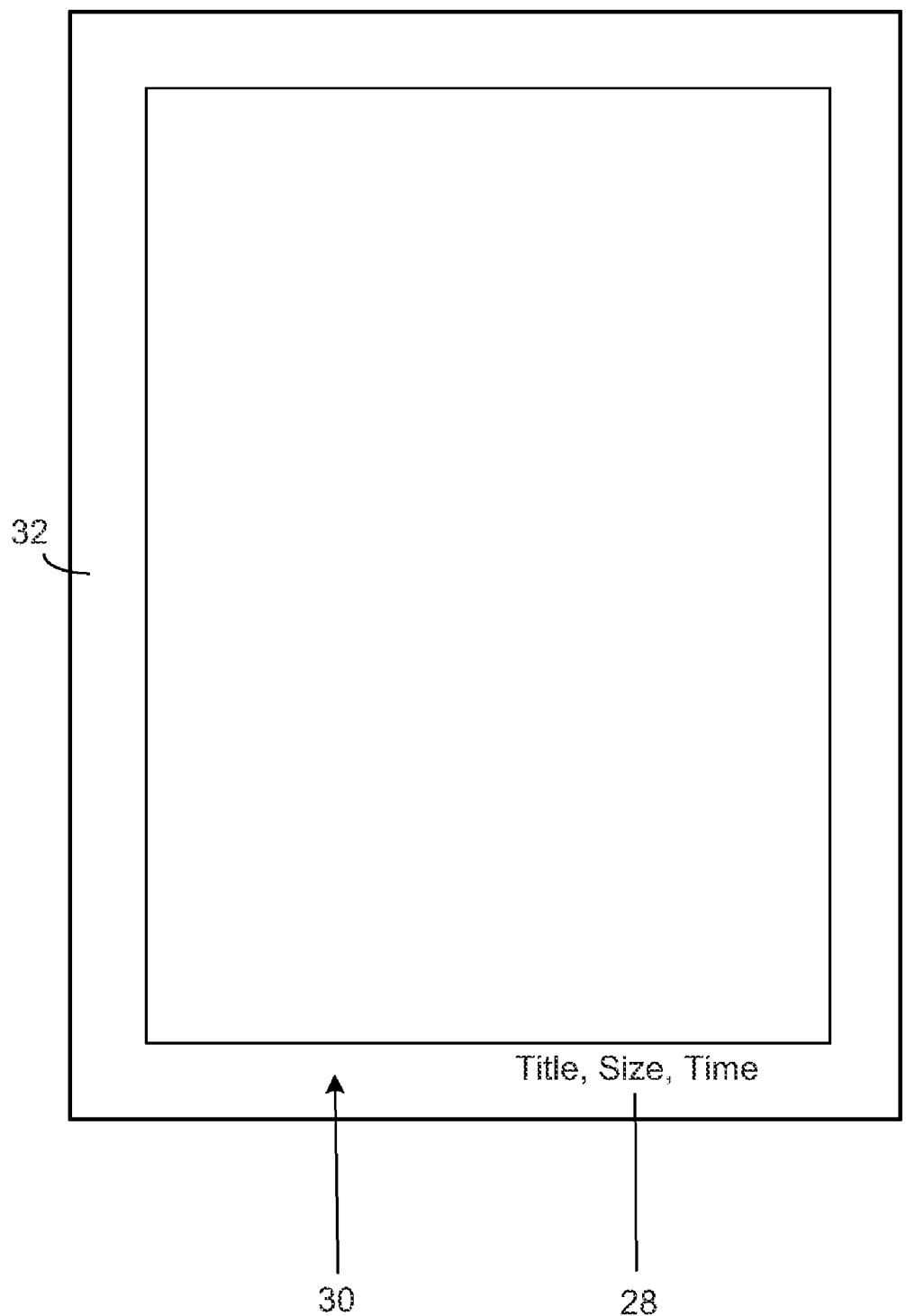
FIG. 3 illustrates a video frame with embedded identifier information in accordance with the present invention.

In a preferred embodiment of the present invention, as shown in FIG. 3, the textual identifier information 28 is embedded in each frame of a video, so that the video is identifiable to the accuracy of a frame. In a more preferred embodiment of the present invention the textual identifier information 28 is placed on the outside periphery of each frame of the video 30. In a particularly preferred embodiment of the present invention, the placing of the identifier information is hidden by displaying the video stream within a graphically created frame 32 that overlaps the periphery of the video so as to obscure the identifier information placed in the periphery of the video. In another embodiment of the present invention a graphic file has textual identifier information placed on its periphery as done with a video stream above.

In another embodiment of the present invention, the video content comprises a stream of packets containing the elements of the video. Each packet contains informational headers indicating the content contained in the packet. Identifier information is placed into informational packets that are located within a video stream. These informational packets contain headers identifying them as non-video packets. The information packets are not displayed by the video viewer, but are used by the identifier creation process to acquire identifier information for each whole, segment, or frame of the video.

In an embodiment of the present invention, the content comprises graphic or video files wherein the identifier information is not located inside of the file itself. To acquire identifier information, the process searches the content surrounding the graphic or video on the content provider's computer. The process also searches the content of a web page surrounding links to the graphic or video, or receives identifier information directly from the content provider. Alternatively, the identifier information is placed in a file accompanying the graphic or video file.

In an embodiment of the present invention, the process generates identifiers to be searched by automatically locating video streams or graphics on the web, reading any associated text surrounding any links to the video stream or graphic, and using the text to create an identifier or identifiers for a video or graphic file. The process also searches through web sites that contain video streams or graphics, and using pointers in such web sites that open or click to the video stream or graphic or web page containing the video stream or graphic, and "reverse locates" any text description of the video stream. Additionally, a database of links contained in a large number of other web sites from throughout the world wide web, such as a typical database created by a web spider or web crawler, is searched for other web pages with links to the video or graphics file. After generating an identifier, the process stores the identifier in a database. In a preferred embodiment of the present invention, the database is stored in a storage device, such as a hard disk, optical disk, floppy disk or similar device.

For example, when a link is used to open a video stream, the process automatically searches to find all of the web pages where the link is contained, whether from the same web site as the video or graphic file or other web site. Once a link to the graphic or video is found, the process searches in the "neighborhood" around the link to acquire relevant text information. The text in the "neighborhood" or area around the link is likely to contain descriptive and informational terms of interest. The closer to the link, the more likely the text is to contain relevant information. Text within the same paragraph, column, or general page area as the link, is likely to contain some information that can be placed into a searchable identifier. When more than one web page is found that contains links to the video or graphic, a comparison is performed on the "neighborhood" text from the various web pages and terms or phrases that appear on more than one web page. Such terms in common are given more weight in the identifier for the video stream. Further, the more of these web pages that include the same terms, the more weight is given to these terms in the identifier.

In a preferred embodiment of the present invention, text parsing techniques are used to identify relevant lines of text to incorporate into the textual description and other textual fields such as a date of creation, size, or category of the video in the identifier. Alternatively, keywords are used to locate and incorporate relevant information into the textual description and other textual fields in the identifier.

In an additional embodiment of the present invention, the process solicits a user to submit information regarding a graphic or video file and then generates one or more tags to be inserted into the area surrounding the link to the graphic or video file. Currently, meta-tags exist for describing a page of content, but additional specialized tags may be created to contain identifier information for other specific types of content. Once the tags are inserted into the area surrounding the link, the automatic identifier creation process creates a searchable link to the video or graphic.

In an additional embodiment of the present invention, the process solicits a user to submit information regarding a graphic or video file. Using the user provided information along with the location of the file, the process generates an identifier, and saves the identifier in a database. Alternatively, the process solicits a user to submit information regarding a graphic or video file and then generates a file that contains identifier information about the graphic or video file to accompany the graphic or video file.

An embodiment of the present invention allows a user to search through identifiers to locate one or more graphics or videos. The process locates and retrieves video and graphic files by searching through the identifiers in a database for desired attributes and uses the location information in the identifier to acquire the file.

Figure 4:
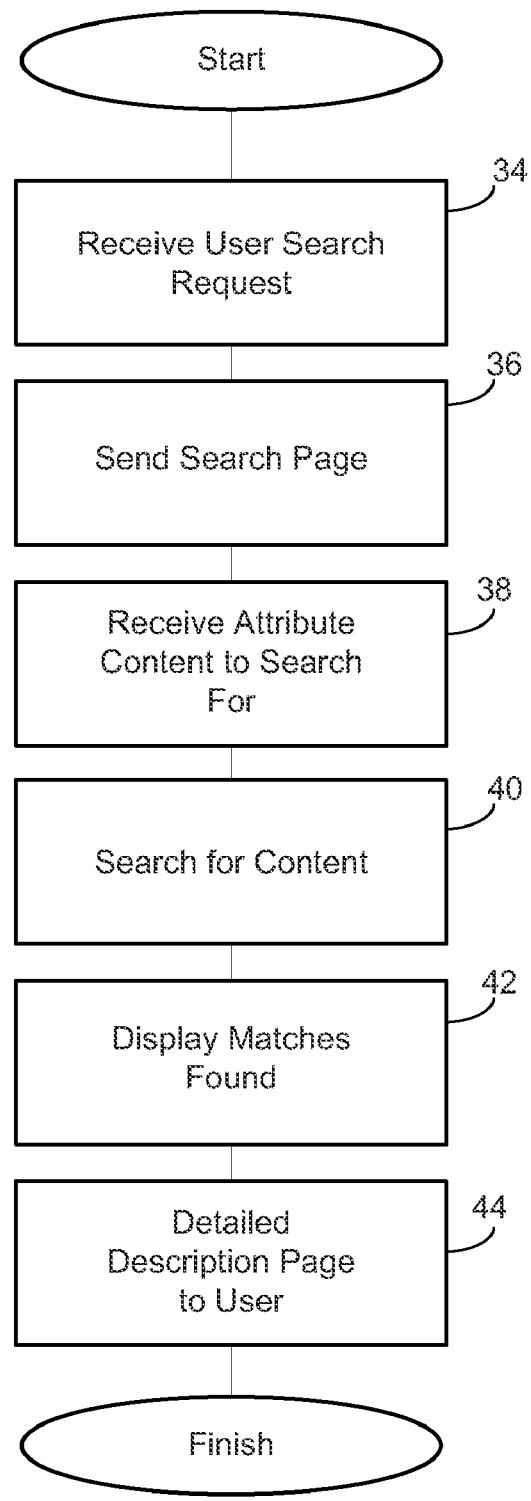
FIG. 4 is a flow diagram of a search process of the present invention.

In a preferred embodiment of the present invention, as shown in FIG. 4, in response to a user request 34, the process generates a search screen 36 containing several fields, each for a different searchable attribute, prompting the user to specify the content of each attribute that they would like to search by. The process receives the user's search criteria 38 and then conducts a search of the various file identifiers in a storage device 40. The process generates a results page 42 listing matches to the user's search criteria. The results page comprises hotlinks to the graphic or video files, as well as descriptions and other attributes of the files.

In another embodiment of the present invention, the results page provides a link to a detailed information page 44. The process caches a portion of a video, or an attribute of the video, such as an audio segment, or at least one video frame or sub-frame, to enable a user to further identify content. Additionally, the process aggregates the identifiers for display to users on the detailed information page.

In a preferred embodiment of the present invention, the process assembles a "video guide" that comprises: a text description of a video, a URL or other location indicator for locating a whole, segment, or frame of a video, an audio sample from the video, and "teaser" frames or segments of a video to assist in the identification or promotion of a video. In an embodiment of the present invention, the "video guide" is resident on a central server, in a local unit, or a combination of both.

In a more preferred embodiment of the present invention, the "video guide" enables a user to locate, display, download, and record a selected whole, segment, frame, or sub-component of a video. Moreover, the "video guide" allows a user to conduct all of the above operations, as well as finding, selecting, grouping, erasing, concatenating, segmenting, and integrating a class of videos. In a preferred embodiment of the present invention, the "video guide" is a software, firmware, or hardware feature resident in a personal computer or similar device capable of storing video streams.

In an additional embodiment of the present invention, the process integrates video or graphic information with a conditional access system or a payment system. The identifier for the video or graphic contains a field indicating whether there is a conditional access or payment system. If there is a conditional access or payment system, then the identifier contains information about the access site or payment system and/or a link to the access site or payment system. In a preferred embodiment of the present invention, the process solicits the user for the authorization information or payment, and only upon proper authorization allows the user to access the video or graphic.

In an additional embodiment of the present invention, the process integrates video stream information with television programs that are receivable on the same device enabling the video or graphic search. If there is a link to a television show, the identifier contains a link to that televisions show and conveys that information to a user. Additionally, the process enables the user to search for video streams and graphics using television links as a searchable attribute.

In an additional embodiment of the present invention, the process integrates video stream information with other information, such as guides or lists of other items associated with the video stream. Items associated with the video or graphic include products, services, and web sites. Additionally, the process provides links to other information, whether or not that information is related to the video.

In an additional embodiment of the present invention, the process allows the user to customize, program, or set parameters for the usage of the process, such as smart agent filtering, a programmed search of certain types of video streams already in existence, and programmed "alert" searching for types of video streams coming into existence in the future. Additionally, the process provides a means of filtering, selecting or blocking whole video files, video segments, and video frames in accordance with user controls, such as the blocking of violence or nudity from a video.

The preceding description has been presented with reference to the presently preferred embodiments of the invention shown in the drawings. Workers skilled in the art and technology to which this invention pertains will appreciate that alteration and changes in the described processes and structures can be practiced without departing from the spirit, principles and scope of this invention.

Accordingly, the present invention provides for a video search engine. Although this invention has been described in certain specific embodiments, many additional modifications and variations would be apparent to those skilled in the art. It is therefore to be understood that this invention may be practiced otherwise than as specifically described. Thus, the present embodiments of the invention should be considered in all respects as illustrative and not restrictive, the scope of the invention to be determined by the claims supported by this application and their equivalents rather than the foregoing description.

The invention claimed is:

1. A computer-implemented method of indexing video content comprising:
    receiving, from a user, through an Internet communication interface, a submission of a video file;
    identifier information of the video file, wherein the identifier information includes a description of the video file and conditional access information about the video file; and
    storing, in a storage device, a location of the video file and the identifier information of the video file;
    receiving a request for the video file, via the Internet and providing the video file in response to the request as a stream of packets; and
    retrieving the identifier information of the video file from the storage device and generating a file including the identifier information of the video file.

2. The method of claim 1, further comprising automatically storing the video file in the storage device.

3. The method of claim 1, further comprising providing a search engine for searching the identifier information stored in the electronic database.

4. The method of claim 1, wherein the identifier information comprises at least one of an author of the video file and an owner of the video file.

5. A computer-implemented method of providing video content comprising:
    using an Internet communication interface, soliciting a user to submit information regarding a video file, wherein the information comprises a location of the video file and a description of the video file;
    receiving at least a portion of the information from submitted by the user in response to the solicitation;
    generating a file comprising the received information;
    providing the file for display, wherein displaying the file comprises displaying at least a portion of the video file;
    wherein providing the file for display comprises providing the video file as a stream of packets; and
    generating an identifier of the video file using the user-submitted information about the video file and saving the identifier in a storage device.

6. The method of claim 5, further comprising automatically storing the video file in a storage device.

7. The method of claim 5, wherein displaying the file further comprises displaying information about an item, wherein the item is at least one of a product, service, and website that is associated with the video file.

8. The method of claim 5, further comprising receiving an instruction to perform an operation with the video file, wherein the operation comprises one or more of viewing, saving, downloading, and sending.

9. A computer system for providing video content comprising:
    a processor, configured to communicate with one or more user devices via the Internet, and to:
    solicit a user to submit information regarding a video file, via a user device, wherein the information comprises a location of the video file and a description of the video file;

receive at least a portion of the information from submitted by the user in response to the solicitation;
generate a file comprising the received information;
provide the file to at least one user device for display, wherein displaying the file comprises displaying at least a portion of the video file;
wherein providing the file for display comprises providing the video file as a stream of packets; and
comprising a storage device, operatively connected to the processor, wherein the processor is further configured to generate an identifier of the video file using the user-submitted information about the video file and store the identifier in the storage device.

10. The system of claim 9, further comprising a storage device, operatively connected to the processor, wherein the processor is further configured to automatically store the video file in the storage device.

11. The system of claim 9, wherein displaying the file further comprises displaying information about an item, wherein the item is at least one of a product, service, and website that is associated with the video file.

12. The system of claim 9, wherein the processor is further configured to receive, from a user device, an instruction to perform an operation with the video file, wherein the operation comprises one or more of viewing, saving, downloading, and sending.

13. The system of claim 9, wherein the solicited information includes at least one of an author of the video file and an owner of the video file.

14. The system of claim 13, wherein displaying the file further comprises displaying at least one of the author of the video file and the owner of the video file.

* * * * *